United States Patent Office 3,595,944
Patented July 27, 1971

3,595,944
OIL- AND WATER-REPELLENT FLUORINE-CONTAINING COMPOSITIONS
George Hall Manning and Samuel John Webster, Runcorn, England, assignors to Imperial Chemical Industries Limited, London, England
No Drawing. Filed Apr. 1, 1968, Ser. No. 717,908
Claims priority, application Great Britain, Aug. 24, 1967, 18,777/67
Int. Cl. C08f 29/22
U.S. Cl. 260—900         11 Claims

ABSTRACT OF THE DISCLOSURE

The oleophobic and hydrophobic properties of polymers of highly fluorinated monomers the fluorinated parts of whose molecules are branched are increased by mixing the polymers with oleophobic and hydrophobic polymers of highly fluorinated monomers whose fluorinated parts have linear structures; preferred mixtures comprise 0.50% to 15% of the latter and 85% to 99.5% of the former. Improved solubility of the mixtures in halogenated solvents is given by co-polymerising the monomers with polymerisable vinyl compounds not containing fluorine, for example butyl methacrylate.

Solutions in such solvents can be applied to textiles to impart oleophobic and hydrophobic properties. Resistance to dry-cleaning and laundering of treated fabrics can be improved by introducing into the copolymerisation systems minor proportions of monomers able to introduce cross-linking sites, for example hydroxyethyl methacrylate, and subsequently curing by heating the treated fabric.

Preferred linear molecules are 1H,1H-pentadecafluorooctyl acrylate and the reaction product of poly(vinyl alcohol) and perfluorooctanoic acid; preferred branched molecules are (i) the methacrylic ester, $$C_{10}F_{19}OC_6H_4CH_2O_2CC(CH_3)\!=\!CH_2$$

of the tetrafluoroethylene pentamer derivative of p-hydroxybenzyl alcohol, (ii) the vinyl ester $$C_{10}F_{19}OC_6H_4CO_2CH\!=\!CH_2$$

of the tetrafluoroethylene pentamer derivative of p-hydroxybenzoic acid and (iii) the vinyl ester $$(C_2F_5)_2(CF_3)CCH_2CO_2CH\!=\!CH_2$$

of tridecafluoro-2-methyl-2-ethyl-1H,1H-butane-1-carboxylic acid.

---

This invention relates to compositions that are mixtures of fluorine-containing organic compounds and possess the property of oil- and water-repellency, and are useful for treating materials such as textiles, leather, paper, and rubber both natural and synthetic in order to impart this property to them.

Some fluorine-containing organic polymers derived from highly fluorinated monomers in which the fluorinated part of the molecule is linear, or contains at the most a small degree of branching, are known to possess oil- and water-repelling properties. Also known are polymers derived from highly fluorinated monomers in which the fluorine-containing part is highly branched. Comparative tests show that those polymers having a predominantly linear structure in the highly fluorinated parts of their molecules are usually superior to those having highly branched structures in oil- and water-repelling formulations suitable for application to textiles, leather and paper.

We have now found that mixtures of these two types of fluorine-containing polymers possess unexpectedly high degrees of oil- and water-repellency in relation to the amount present of the polymer derived from the substantially linear monomer.

Thus the invention in its general form provides novel compositions possessing oil- and water-repelling properties comprising mixtures of at least one fluorine-containing organic polymer of a highly fluorinated monomer in which the fluorinated part of the molecule is linear or only slightly branched, and at least one fluorine-containing organic polymer of a highly fluorinated monomer in which the fluorinated part of the molecule is highly branched.

Within the scope of this specification the term polymer also includes copolymers of the monomers whose fluorinated parts of the molecule are highly branched, and also copolymers of the monomers whose fluorinated parts are predominantly linear. This comes about because in the application of oil- and water-repelling finishes to textiles and other materials it is convenient to apply the formulation as a solution in water or in a chlorinated solvent, for example, 1,1,1-trichloroethane, and the solubility of the novel compositions in such solvents can be much increased by the presence of a proportion in the copolymer between the fluorinated monomer and a non-fluorine containing monomer, for example alkyl methacrylates, acrylates and vinyl esters of which butyl methacrylate is particularly suitable.

Also within the scope of the invention is the incorporation in the co-polymers of minor proportions of monomers containing cross-linking sites in their molecules, for example hydroxyethyl methacrylate, methylol acrylamide and glycidyl methacrylate. Cross-linking occurring during subsequent curing operations on textiles treated with oil- and water-repelling compositions confers resistance to dry-cleaning and laundering processes. Toluylene diisocyanate is a convenient cross-linking agent for compositions containing hydroxyethyl methacrylate, and chloracetic acid for those containing methylol acrylamide.

The invention also comprises a method of imparting oil- and water-repelling properties to textiles, yarns, threads, felts, leather, paper, rubber both natural and synthetic, plastic materials, glass and ceramics by treating them with the novel compositions, and it also comprises these various materials when rendered oil- and water-repellent by said treatment.

The proportion in the compositions of the polymer of the monomer whose fluorinated part is linear or only slightly branched is conveniently from 1% to 25% by weight of the composition, but it may be less than 1% or greater than 25%. Particularly suitable proportions are from 0.50% to 15%.

Among fluorinated monomers in which the fluorine-bearing part is highly branched and which yield polymers suitable for the compositions of the invention are polymerizable or polymeric derivatives of branched-chain, internally unsaturated oligomers of perfluoroolefins or of degradation products of such oligomers; polymerisable derivatives of fluorine-containing tertiary and secondary alcohols and ketones. Examples of these monomers are polymerisable derivatives of oligomers of tetrafluoroethylene such as those containing acrylic groups, for example the acrylic ester, $$C_{10}F_{19}OC_6H_4CH_2O_2CCH\!=\!CH_2$$

and the corresponding methacrylic ester of the tetrafluoroethylene pentamer derivative $C_{10}F_{19}OC_6H_4CH_2OH$; the acrylic ester of the derivative $C_{10}F_{19}OCH_2CH_2OH$; and the vinyl ester, $C_{10}F_{19}OC_6H_4CO_2CH\!=\!CH_2$, of the derivative $C_{10}F_{19}OC_6H_4COOH$; the reaction product with polyvinyl alcohol of the ketone, $$(C_2F_5)_2CF_3.C.CH\!=\!C\!=\!O$$

the latter being made by elimination of the elements of water from tridecafluoro-2-methyl-2-ethyl-1H,1H-butane-1-carboxylic acid, $(C_2F_5)_2(CF_3)CCH_2COOH$; and acrylic esters of the perfluorotertiary alcohols $(C_2F_5)_3COH$ and $(C_2F_5)_2(CF_3)COH$. Further examples of these monomers include acrylic esters and methacrylic esters of highly fluorinated isopropyl alcohols such as s-hexafluoroisopropyl alcohol and perfluoroisopropyl alcohol and s-tetrafluorodichloroisopropyl alcohol; and polymerisable derivatives of the perfluoroketones $(CF_3)_2CO$, $(C_2F_5)_2CO$, $(C_2F_5)(CF_3)CO$ and of the highly fluorinated ketone $(C_2F_5)_2(CF_3)CCH_2COCF_3$.

Other types of fluorinated monomers having highly branched structures include polymerisable epoxide derivatives of perfluorotertiary alcohols such as $$(C_2F_5)_3COCH_2CH{-}CH_2$$
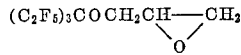

and monomers in whose molecules the highly branched fluorine-bearing part is linked to the unsaturated polymerisable part by other groups, for example acrylic and methacrylic esters of the substituted alkanols $$R_f(CH_2)_nOH$$

where $R_f$ represents a branched perfluoroalkyl group and $n$ is an integer equal to 2 or more.

Among highly fluorinated monomers in which the fluorine-bearing part is linear or substantially linear and which yield polymers suitable for the compositions of the invention are polymerisable derivatives of perfluoroalkanoic and perfluorosulphonic acids containing 4 to 20, preferably 5 to 10 carbon atoms in the chain, for example the vinyl esters of perfluorooctanoic acid, and of other acids, for example $(CF_3)(CF_2Cl)CF(CF_2)_nCOOH$ and $(CF_3)_2CF(CF_2)_nCOOH$; acrylic esters of omega-perfluoroalkyl-substituted alkanols $$C_nF_{2n+1}(CH_2)_mOH$$

where the $C_nF_{2n+1}$ group is linear and $n$ is from 3 to about 12 and $m$ is from 1 to about 12, for example $CF_3(CF_2)_6CH_2O_2CCH{=}CH_2$, 1H,1H - pentadecafluorooctyl acrylate.

Tables 1–3 show the oil-repelling ratings of materials after treatment with various mixtures of the invention as determined by the method described in the Minnesota Mining and Manufacturing Company's publication "3M Textile Chemicals" Appendix A—Test Methods, page 1, and also described in UK specification No. 1,062,221, page 4, line 26, to page 5, line 11. The higher the rating number the greater the oil-repelling effect. Table 1 shows mixtures of the reaction product of polyvinyl alcohol and perfluoroctanoic acid, referred to as A and having a linear structure, and the reaction product of polyvinyl alcohol and the highly branched fluorinated ketene $(C_2F_5)_2(CF_3)CCH{=}C{=}O$ referred to as B. Table 2 shows mixtures of A and the polymer $$(C_{10}F_{19}OC_6H_4CO_2CH{=}CH_2)_n$$

referred to as C, in which the $C_{10}F_{19}$ part of the molecule is highly branched and derived from the oligomer $(C_2F_4)_5$.

The mixtures were dissolved in 1,2,2-trifluoro-1,1,2-trichloroethane to give solutions containing 2% by weight/volume. The solutions were applied to cotton gaberdine and wool gaberdine by padding to give a 1 to 2% pick-up of solids, and to suede leather by spraying.

TABLE 1.—MIXTURES OF A AND B

| Mixture weight-ratio | | Oil-repelling ratings | | |
|---|---|---|---|---|
| | | Gaberdine | | Suede leather |
| A | C | Cotton | Wool | |
| 0 | 100 | 50 | 70 | 70 |
| 1 | 99 | 80 | 70 | 80 |
| 10 | 90 | 90 | >100 | >100 |
| 100 | 0 | >100 | >100 | >100 |

TABLE 2.—MIXTURES OF A AND C

| Mixture weight-ratio | | Oil-repelling ratings | | |
|---|---|---|---|---|
| | | Gaberdine | | Suede leather |
| A | C | Cotton | Wool | |
| 0 | 100 | 0 | 0 | 0 |
| 1 | 99 | 70 | 100 | 90 |
| 10 | 90 | 100 | >100 | >100 |
| 100 | 0 | >100 | >100 | >100 |

Table 3 shows mixtures containing 10% by weight of the homopolymer $(C_7F_{15}CH_2O_2CCH{=}CH_2)_n$ of 1H,1H-pentadecafluorooctyl acrylate, referred to as component X, and 90% by weight of homopolymers, referred to as component Y, of respectively (i) the acrylic ester of perfluoroisopropyl alcohol, $$(CF_3)_2CFO_2CCH{=}CH_2$$

(ii) the acrylic ester of s-hexafluoroisopropyl alcohol, $(CF_3)_2CHO_2CCH{=}CH_2$, (iii) the methacrylic ester $$(C_2F_5)_2CF_3CCH_2CO_2CH_2CH_2O_2CC(CH_3){=}CH_2$$

of the monoethylene glycol ester $$(C_2F_5)_2CF_3CCH_2CO_2CH_2CH_2OH$$

of the acid $(C_2F_5)_2CF_3CCH_2COOH$, that is to say tridecafluoro-2-methyl-2-ethyl-1H,1H-butane - 1 - carboxylic acid, (iv) the methacrylic ester $$C_{10}F_{19}OC_6H_4CH_2O_2CC(CH_3){=}CH_2$$

of the tetrafluoroethylene pentamer derivative $$C_{10}F_{19}OC_6H_4CH_2OH$$

of p-hydroxybenzyl alcohol, (v) the vinyl ester $$(C_2F_5)_2CF_3CCH_2CO_2CH{=}CH_2$$

of tridecafluoro - 2 - methyl-2-ethyl-1H,1H-butane-1-carboxylic acid.

TABLE 3

| | Oil-repelling ratings | | |
|---|---|---|---|
| | Gaberdine | | Suede leather |
| Mixtures 90% Y, 10% X by weight—Y | Cotton | Wool | |
| (i) $[(CF_3)_2CFO_2CCH{=}CH_2]_n$ | 100 | >100 | 70 |
| (ii) $[(CF_3)_2CHO_2CCH{=}CH_2]_n$ | >100 | >100 | 100 |
| (iii) $[(C_2F_5)_2CF_3CCH_2CO_2CH_2CH_2O_2CC(CH_3){=}CH_2]_n$ | >100 | >100 | 100 |
| (iv) $[C_{10}F_{19}OC_6H_4CH_2O_2CC(CH_3){=}CH_2]_n$ | >100 | >100 | 100 |
| (v) $[(C_2F_5)_2CF_3CCH_2CO_2CH{=}CH_2]_n$ | >100 | >100 | 90 |

Table 4 shows the effect on the resistance to dry-cleaning and laundering operations that can be given by incorporating in mixtures of copolymers of highly branched monomers and copolymers or homopolymers of predominantly linear monomers minor proportions of monomers containing cross-linking sites in their molecules. Toluylene diisocyanate was used as such a monomer for copolymer mixtures containing hydroxyethyl methacrylate, and chloracetic acid for those containing methylol acrylamide. The various mixtures (90% branched chain, 10% substantially linear chain molecules, by weight) were applied to cotton gaberdine as solutions in 1,1,1-trichloroethane, and the treated cloths cured at 150° C. and then evaluated for water- and oil-repellency. The treated cloths were then subjected to dry-cleaning and laundering cycles and again evaluated.

The dry-cleaning cycle comprised tumbling for 5 minutes in perchlorethylene at room temperature containing 2.25% soap and 0.15% water by weight.

The laundering cycle comprised agitation for 20 minutes at 70°–80° C. in water containing 1% by weight of a proprietary washing powder based on inorganic polyphosphates and organic surface-active agents, drying and ironing.

In Table 4 OR signifies oil-repelling rating determined as hereinbefore described, and WR signifies water spray rating determined as described in British standard specification No. 3702.

Also in Table 4

BMA signifies butyl methacrylate
FOA signifies 1H,1H-pentadecafluorooctyl acrylate
HEMA signifies hydroxyethyl methacrylate
VPC signifies vinyl ester of tridecafluoro-2-methyl-2-ethyl-1H,1H-butane-1-carboxylic acid
VPOB signifies vinyl ester of the tetrafluoroethylene pentamer derivative of p-hydroxybenzoic acid $$C_{10}F_{19}OC_6H_4CO_2CH=CH_2$$

POBMA signifies methacrylic ester of the tetrafluoroethylene pentamer derivative of p-hydroxybenzyl alcohol $$C_{10}F_{19}OC_6H_4CH_2O_2CC(CH_3)=CH_2$$

MAM signifies N-methylol acrylamide.

$$(CF_3)_2CFOH$$

(2) homopolymers of the glycidyl derivatives of any of the above alcohols,
(3) homopolymers of the vinyl esters of the acids having the formulae $$(C_2F_5)_2(CF_3)C.CH_2COOH$$

$$R_fOC_6H_4COOH$$

$$R_fOC_6H_4CH_2COOH$$

in which $R_f$ is a branched perfluoroaliphatic group derived from branched oligomers of tetrafluoroethylene (4) homopolymer of vinyl alcohol esterified with the ketene $(C_2F_5)_2(CF_3)C.CH=C=O$
(5) and copolymers of any of the said homopolymers containing branched perfluorocarbon chains with non-fluorine-containing vinyl and acrylic ester monomer.

2. A polymeric composition as claimed in claim 1 in which incorporated in the copolymers are minor proportions of monomers containing cross-linking sites in their molecules.

3. A polymeric composition as claimed in claim 2 in which the monomers containing cross-linking sites in their molecules are selected from hydroxyethyl methacrylate, methylol acrylamide and glycidyl methacrylate.

4. A polymeric composition comprising (a) from 0.50% to 15% by weight of a homopolymer of 1H,1H-pentadecafluorooctyl acrylate and (b) from 85% to 99.5% by weight of a homopolymer of a monomer selected from (i) the methacrylic ester $$C_{10}F_{19}OC_6H_4CH_2O_2CC(CH_3)=CH_2$$

TABLE 4

| Branched chain component | Linear chain component | Initial properties WR | Initial properties OR | After dry cleaning WR | After dry cleaning OR | After laundering WR | After laundering OR |
|---|---|---|---|---|---|---|---|
| (VPC plus BMA plus HEMA)$_n$ | (FOA)$_n$ | 5 | >100 | 3 | 100 | 3 | 10 |
|  | (FOA plus BMA plus HEMA)$_n$ | 4 | 100 | 3 | 100 | 3 | 90 |
| (VPC plus BMA plus MAM)$_n$ | (FOA)$_n$ | 5 | >100 | 3 | 90 | 4 | 100 |
| (VPOB plus BMA plus HEMA)$_n$ | (FOA)$_n$ | 5 | >100 | 3 | 80 | 4 | 80 |
|  | (FOA plus BMA plus HEMA)$_n$ | 4 | 100 | 2 | 60 | 3 | 80 |
| (POBMA plus BMA plus HEMA)$_n$ | (FOA plus BMA plus HEMA)$_n$ | 4 | 100 | 3 | 90 | 3 | 60 |

What we claim is:
1. A polymeric composition comprising
   (a) from 0.50% to 15% by weight of a fluorinated polymeric material selected from the group consisting of homopolymers of the vinyl esters of perfluoroalkanoic acids, and copolymers of the said esters with nonfluorine-containing vinyl and acrylic ester monomers, in all of which the perfluoro part of the molecule is an unbranched aliphatic chain containing from 4 to 20 carbon atoms, and
   (b) from 85% to 99.5% by weight of a fluorinated polymeric material selected from the group consisting of
      (1) homopolymers of the acrylates and methacrylates and epoxy containing derivatives of the alcohols having the formulae

$$R_fOC_6H_4CH_2OH$$

$$R_fOCH_2CH_2OH$$

$$R_f(CH_2)_nOH$$

where n is 2 or more in which $R_f$ is a branched perfluoroaliphatic group derived from branched oligomers of tetrafluoroethylene and of alcohols having the formulae $$(C_2F_5)_2(CF_3)C.CH_2COOCH_2CH_2OH$$

$$(C_2F_5)_2(CF_3)-OH$$

$$(C_2F_5)_3C-OH$$

$$(CF_3)_2CHOH$$

of the tetrafluoroethylene pentamer derivative of p-hydroxybenzyl alcohol $C_{10}F_{19}OC_6H_4CH_2OH$, (ii) the vinyl ester $C_{10}F_{19}OC_6H_4CO_2CH=CH_2$ of the tetrafluoroethylene pentamer derivative of p-hydroxybenzoic acid $$C_{10}F_{19}OC_6H_4COOH$$

and (iii) the vinyl ester of tridecafluoro-2-methyl-2-ethyl-1H,1H-butane-1-carboxylic acid, $$(C_2F_5)_2(CF_3)CCH_2CO_2CH=CH_2$$

5. A polymeric composition comprising (a) from 0.50% to 15% by weight of a homopolymer of 1H,1H-pentadecafluorooctyl acrylate and (b) from 85% to 99.5% by weight of a copolymer of butyl methacrylate and a monomer selected from (i) the methacrylic ester of the tetrafluoroethylene pentamer derivative of p-hydroxybenzyl alcohol, (ii) the vinyl ester of the tetrafluoroethylene pentamer derivative of p-hydroxybenzoic acid and (iii) the vinyl ester of tridecafluoro-2-methyl-2-ethyl-1H,1H-butane-1-carboxylic acid.

6. A polymeric composition comprising (a) from 0.50% to 15% by weight of a copolymer of 1H,1H-pentadecafluorooctyl acrylate and butyl methacrylate, and (b) from 85% to 99.5% by weight of a copolymer of butyl methacrylate and a monomer selected from (i) the methacrylic ester of the tetrafluoroethylene pentamer derivative of p-hydroxybenzyl alcohol, (ii) the vinyl ester of the tetrafluoroethylene pentamer derivative of p-hydroxybenzoic acid and (iii) the vinyl ester of tridecafluoro-2-methyl-2-ethyl-1H,1H-butane-1-carboxylic acid.

7. A polymeric composition as claimed in claim 6 in which at least one of the copolymers includes minor proportions of monomers containing cross-linking sites in their molecules and selected from hydroxyethyl methacrylate and methylol acrylamide.

8. A polymeric composition comprising (a) from 0.50% to 15% by weight of the reaction product of poly(vinyl alcohol) and perfluorooctanoic acid and (b) 85% to 99.5% by weight of the reaction product of poly(vinyl alcohol) and the ketene $(C_2F_5)_2(CF_3)CCH=CO$.

9. A polymeric composition comprising (a) from 0.50% to 15% by weight of the reaction product of poly(vinyl alcohol) and perfluorooctanoic acid and (b) 85% to 99.5% by weight of the homopolymer of the vinyl ester of the tetrafluoroethylene pentamer derivative of p-hydroxybenzoic acid.

10. A method of rendering textile fibres and leather oleophobic and hydrophobic comprising treating them with a polymeric composition as claimed in claim 1.

11. A polymeric composition as claimed in claim 1 wherein the said oligomer is the pentamer.

References Cited
UNITED STATES PATENTS

| | | | |
|---|---|---|---|
| 3,277,039 | 10/1966 | Marascia et al. | 260—29.6 |
| 3,256,230 | 6/1966 | Johnson et al. | 260—29.6 |
| 3,393,186 | 7/1968 | Groves | 260—89.5 |

MURRAY TILLMAN, Primary Examiner

C. J. SECCURO, Assistant Examiner

U.S. Cl. X.R.

117—139.5, 142, 161; 260—836